United States Patent [19]

Vautrin

[11] 4,392,480
[45] Jul. 12, 1983

[54] HEAT STORAGE AND DELIVERY APPARATUS

[76] Inventor: Wayne Vautrin, Rte. #2, Park Rapids, Minn. 56470

[21] Appl. No.: 393,066

[22] Filed: Jun. 28, 1982

Related U.S. Application Data

[63] Continuation of Ser. No. 242,895, Mar. 12, 1981, abandoned.

[51] Int. Cl.³ ............................ F24H 7/00; F24J 3/02
[52] U.S. Cl. .................................. 126/400; 126/430; 126/422; 126/435; 165/10
[58] Field of Search ........ 126/400, 420, 422, 429–432, 126/436, 435, 450; 165/10, 48 S

[56] References Cited

U.S. PATENT DOCUMENTS

| 2,677,367 | 5/1954 | Telkes | 126/400 |
|---|---|---|---|
| 3,464,486 | 9/1969 | Rice et al. | 126/400 |
| 3,987,786 | 10/1976 | Keyes et al. | 126/430 |
| 4,029,258 | 6/1977 | Groth | 126/429 |
| 4,061,129 | 12/1977 | Wilson | 126/400 |
| 4,240,404 | 12/1980 | Franchina | 126/400 |
| 4,248,209 | 2/1981 | Wasserman | 126/435 |
| 4,250,871 | 2/1981 | Milburn, Jr. | 126/430 |
| 4,258,697 | 3/1981 | Flagg | 126/400 |
| 4,262,653 | 4/1981 | Holland | 126/400 |
| 4,262,655 | 4/1981 | Jackson | 126/429 |

FOREIGN PATENT DOCUMENTS 2238612 2/1974 Fed. Rep. of Germany ...... 126/400
2431098 3/1980 France .............................. 126/430

Primary Examiner—James C. Yeung
Attorney, Agent, or Firm—Williamson, Bains, Moore & Hansen

[57] ABSTRACT

A heat storage and delivery apparatus includes a cabinet containing a plurality of heat storage rods which absorbs and stores heat when heated air is directed over the surfaces thereof. A delivery passage and a return passage within the cabinet are adapted to be connected to a heat generator, preferably a solar collector, to permit heated air to be circulated over the heat storage rods. A charging blower and a delivery blower control the flow of air between the solar collector and cabinet, and between the cabinet and the area to be heated. An air distributor effectively distributes air from the charging blower over the heat storage rods. Heat responsive controls operate the charging and delivery blowers in response to changes in temperature in the cabinet, the area to be treated and the solar collector.

10 Claims, 10 Drawing Figures

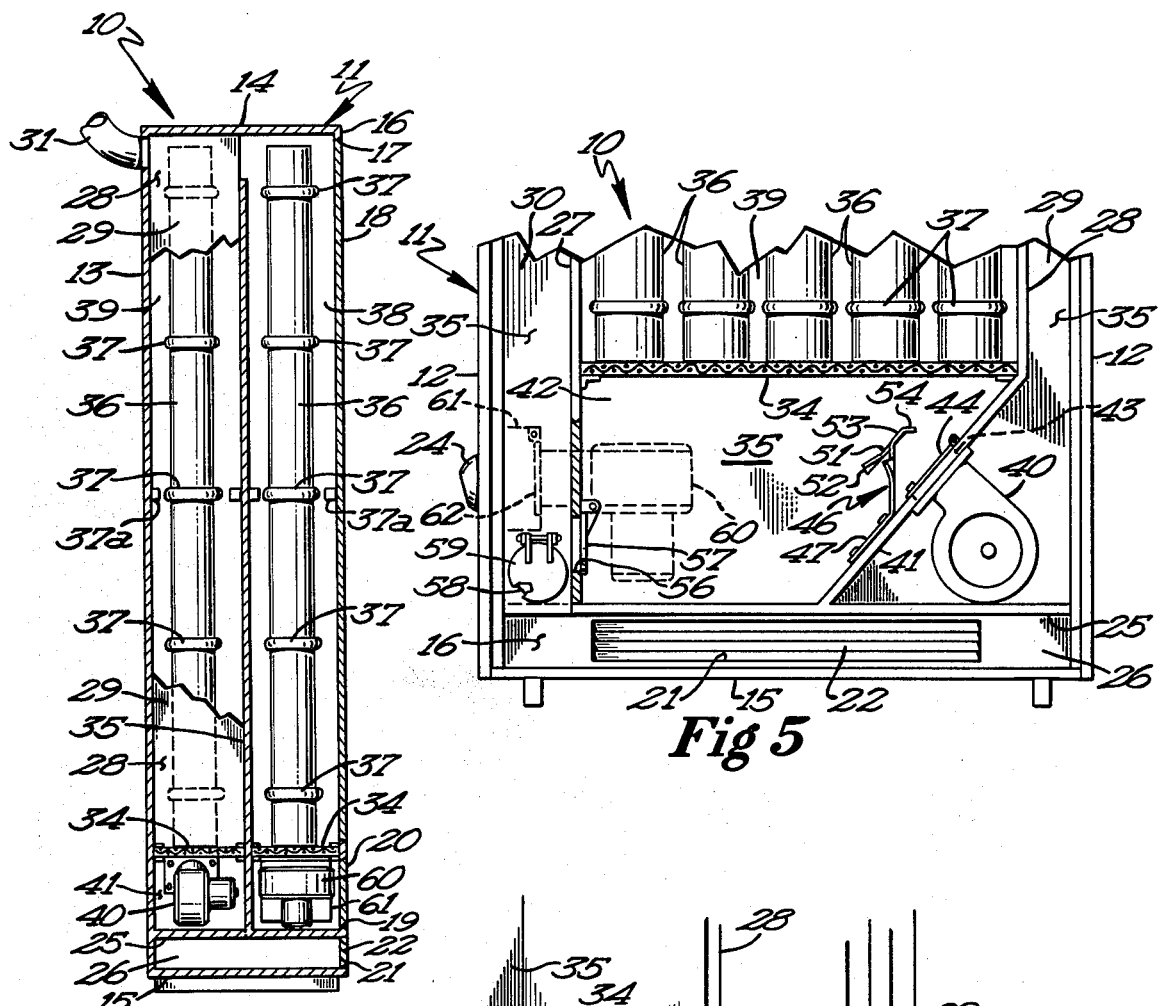
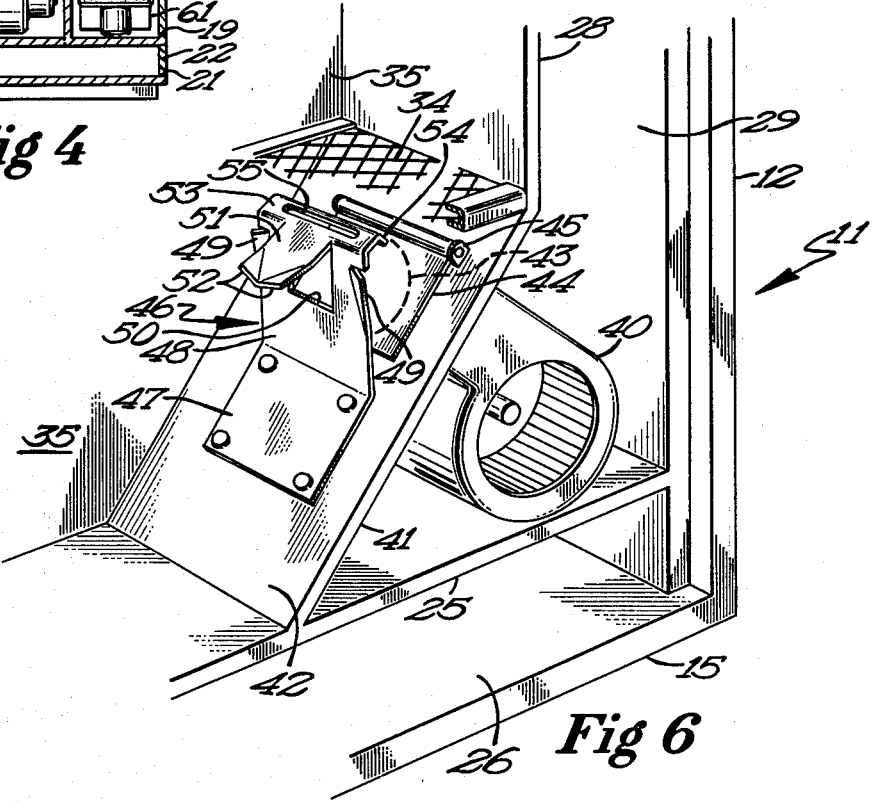

HEAT STORAGE AND DELIVERY APPARATUS

This is a continuation of application Ser. No. 242,895, filed Mar. 12, 1981, now abandoned.

SUMMARY OF THE INVENTION

This invention relates to an apparatus for storing heat and releasing the stored heat into a room to be heated.

It is a general object of this invention to provide a heat storage and release apparatus including a cabinet containing heat storage rods for absorbing and storing heat, and charging and delivery blowers for circulating air between the cabinets and a solar collector, and between the cabinet and the room to be heated so that heat may be collected, stored, and released in response to changes in temperature in the solar collector, the cabinet, and the room to be heated.

A more specific object of this invention is the provision of a heat storage and heat delivery apparatus which includes a cabinet having passages therein for connection to a solar collector to which heated air is circulated from the collector, the heated air being directed from a delivery blower by a heat distributor uniformly over the storage rods.

These and other objects and advantages of this invention will more fully appear from the following description made in connection with the accompanying drawings, wherein like reference characters refer to the same or similar parts throughout the several views.

FIGURES OF THE DRAWINGS

FIG. 4 is a cross-sectional view taken approximately along line 4—4 of FIG. 3 and looking in the direction of the arrows;

FIG. 5 is a cross-sectional view taken approximately along line 5—5 of FIG. 3 and looking in the direction of the arrows;

FIG. 6 is an enlarged perspective view of a portion of the heat storing and delivery apparatus illustrating certain components thereof;

Figure 7:
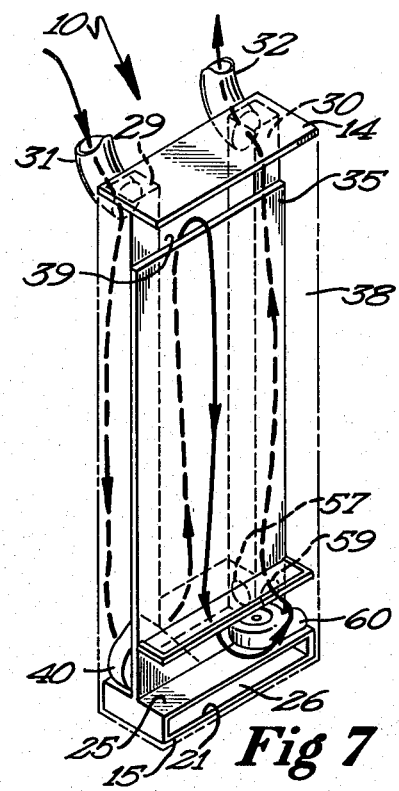
Figure 8:
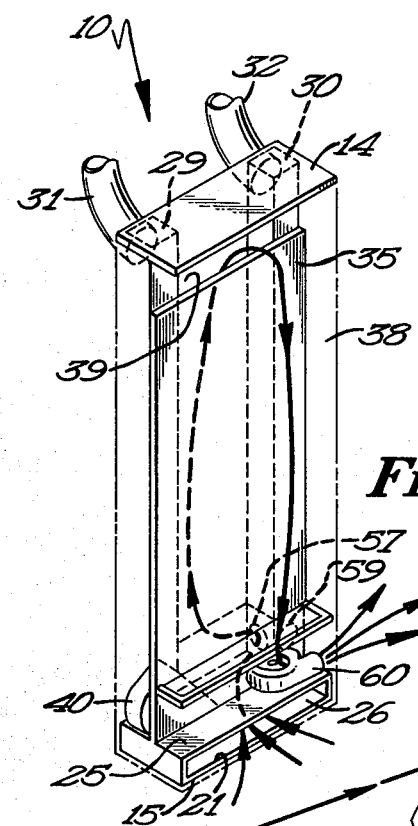
Figure 9:
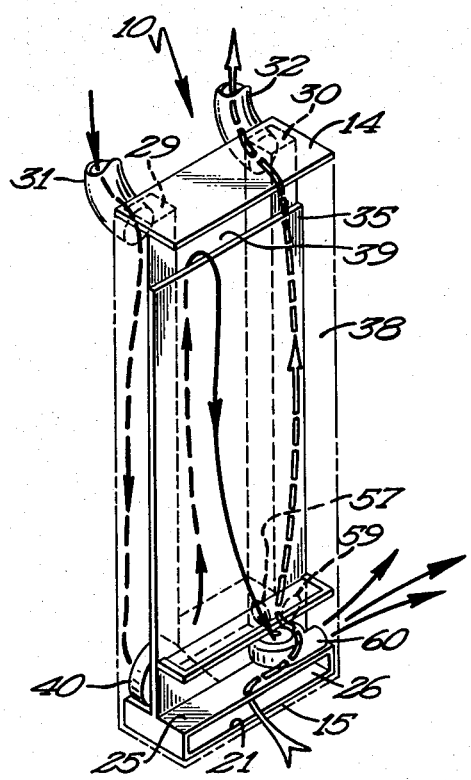
Figure 10:
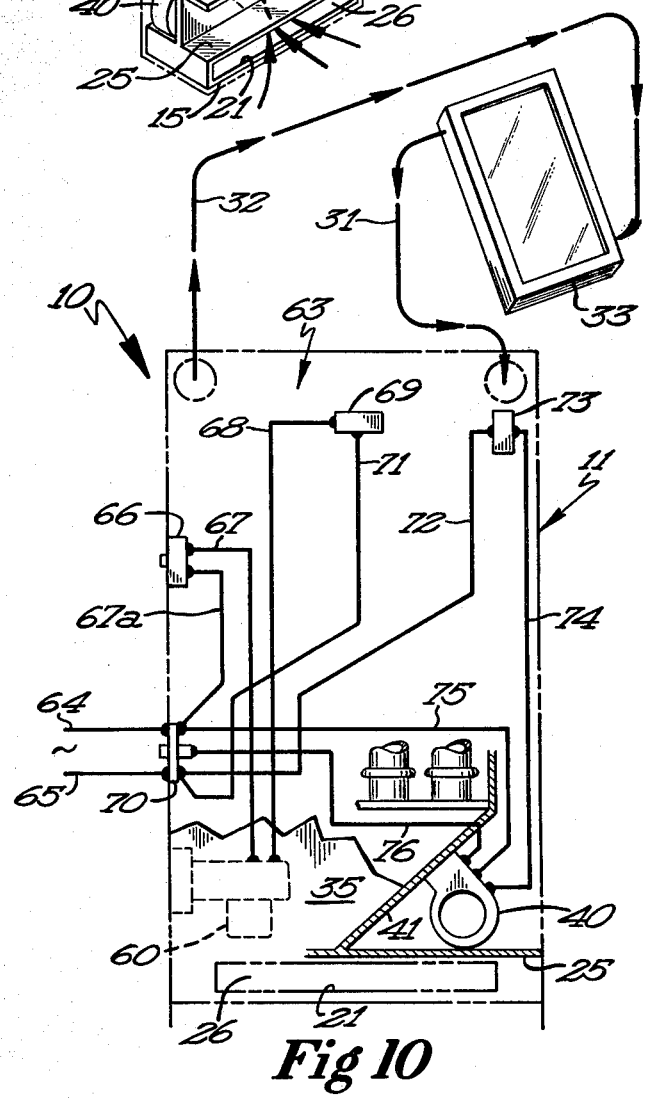

FIGS. 7, 8, and 9 are diagrammatic, perspective views of the heat storage and delivery apparatus illustrating the various operational cycles thereof; and FIG. 10 is a diagram of the electrical system of the heat storage and delivery apparatus.

DESCRIPTION OF THE PREFERRED EMBODIMENT OF THE INVENTION

Figure 1:
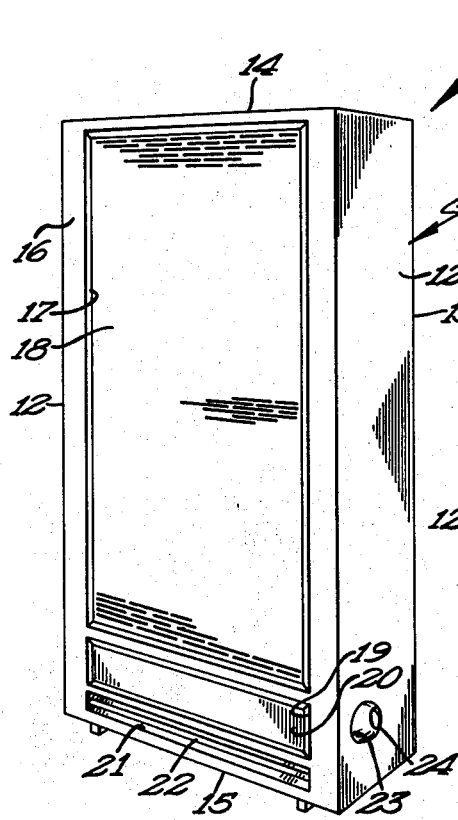
FIG. 1 is a front perspective view of the heat storing and delivery apparatus.

Referring now to the drawings and more specifically to FIG. 1, it will be seen that one embodiment of the novel heat storage and delivery apparatus, designated by the reference numeral 10, is thereshown. The apparatus includes a generally rectangular shaped cabinet 11 having opposed substantially rectangular shaped side walls 12, a rear wall 13, a top wall 14, a bottom wall 15, and a front wall 16. In the embodiment shown, the front wall 16 has a generally rectangular shaped access opening 17 therein which is closed by a generally rectangular shaped imperforate closure panel 18. Suitable bolts or screws may be used to secure the panel 18 to the front wall. The access panel 18 permits access to the heat storage chamber area and the heat storage rods stored therein.

The front of the cabinet 11 also has a generally rectangular shaped opening 19 located below the opening 17 and this lower opening is also closed by a suitable door or panel 20 which is secured to the front of the cabinet by bolts or the like. The opening 19 permits access to the blowers and other components of the apparatus. It will also be noted that a generally rectangular shaped inlet opening 21 is formed in the front of the cabinet 11 below the opening 19 and suitable louvers extend across the opening as best seen in FIG. 1. External air from the room or area to be heated will pass through the louvered openings 22 into the interior of the cabinet during operation of the apparatus 10. Referring again to FIG. 1, it will be seen that one of the side walls 12 is provided with an outlet opening 23 therein adjacent the lower end portion thereof and an air flow director 24 is positioned in the opening to direct and diffuse the heated air which is impelled through the opening during the delivery cycle.

Figure 2:
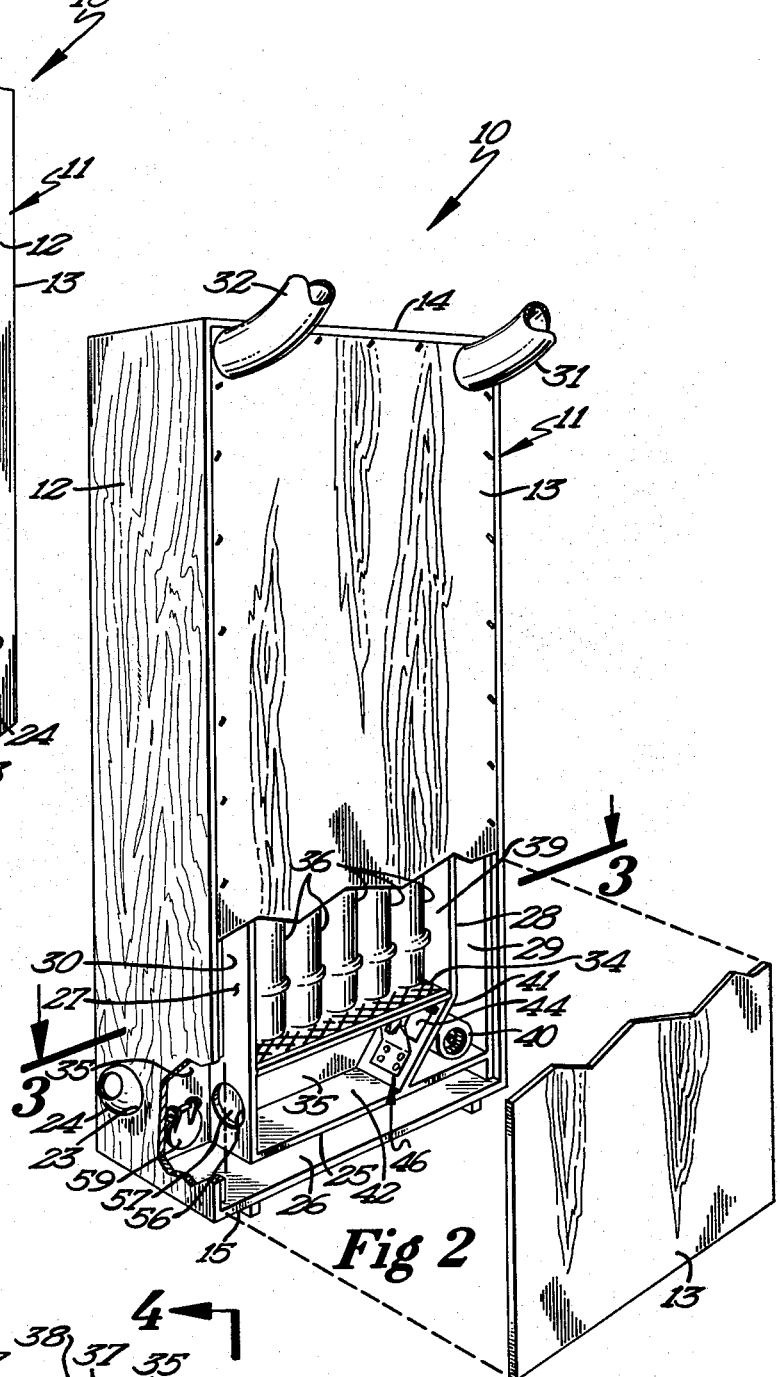
FIG. 2 is a rear perspective view of the heat storage and delivery apparatus with certain parts thereof broken away and other parts exploded.

Referring now to FIGS. 2, 4, and 6, it will be seen that the interior of the cabinet 11 is provided with a false floor or bottom wall 25 located in spaced parallel relation to the bottom wall 15. The volumetric space defined between the bottom wall 15 and the false bottom wall 25 defines a cold air chamber 26 which receives the cool air from the room to be heated through the louvered openings 22 of the inlet.

The interior of the cabinet 11 is provided with vertically disposed substantially parallel, laterally spaced apart inner wall elements 27 and 28. It will be noted that the inner wall element 27 is disposed in adjacent but spaced parallel relation with respect to one of the side walls 12 to define a vertically disposed return passage 30. Similarly, the inner wall element 28 is positioned adjacent but in spaced parallel relation with respect to the other side wall 12 to define a vertically disposed delivery passage 29. It will also be noted that a delivery duct 31 is connected in communicating relation by an opening with the upper end of the delivery passage 29 and that a return duct 32 is connected to an opening in the rear wall to the upper end of the return passage 30. The delivery duct and return duct are also connected in communicating relation to the interior of a plate-type solar collector 33 as best seen in FIG. 10. Heated air from the solar collector passes through the delivery duct 31 into the delivery passage 29 and is circulated through the cabinet and the air is returned through the return passage 30 into the delivery duct 31 to the solar collector.

Figure 3:
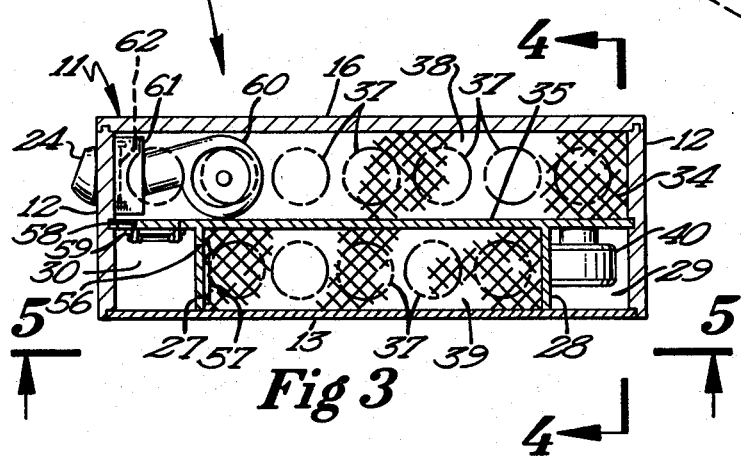
FIG. 3 is a cross-sectional view taken approximately along line 3—3 of FIG. 2 and looking in the direction of the arrows.

The interior of the cabinet 11 is also provided with a horizontally disposed perforated support grating 34 which is positioned above the false floor 25. A vertically disposed, generally rectangular shaped divider wall 35 is secured to the false floor 25 and projects upwardly therefrom through the support grating 34 and terminates at a point spaced below the inner surface of the top wall 14 of the cabinet. The divider wall 35 divides the interior of the cabinet 11 into a front chamber 38 and a rear chamber 39. Referring now to FIG. 3, it will be seen that the rear chamber extends between the inner wall elements 27 and 28 and that the front chamber extends laterally from one side wall 12 to the other side wall of the cabinet.

The front and rear chambers each contain a plurality of similar heat elongate collector rods 36 which contain a heat absorbable material such as eutectic salts. In the preferred embodiment, the heat storage tubes are preferably energy storage rods sold under the tradename THERMOL 81, manufactured by PSI Energy Storage Division, 1533 Fenpark Drive, Fenton, Mi. Referring again to FIG. 3, it will be seen that in the embodiment shown, five vertical rods are positioned in the rear chamber 39 and seven rods are positioned in the front chamber 38. Each storage rod 36 is provided with a plurality of spaced apart annular elements 37 which are positioned on the exterior thereof and which serve to produce turbulence of the air directed vertically over the rods during the charging and delivery cycles. The interior of the cabinet as well as the divider wall 35 is also provided with small obstructions 37a that project laterally therefrom, as best seen in FIG. 4, that also serve to produce turbulence during the vertical flow of air through the front and rear chambers of the cabinet. In this regard, it is pointed out that the turbulent flow of air produces a much more effective heat exchange action between the air and the heat storage rods than a smooth laminar flow along the surface of the rods.

Means are provided for causing air heated by the solar collector to be drawn through the delivery duct and directed over the heat collector rods 36. This means includes a charging blower 40 which is positioned upon the false floor 25 at the lower end of the delivery duct 31. Referring now to FIGS. 2, 5, and 6, it will be seen that a diagonal wall element 41 extends from the lower end of the vertical inner wall element 28 diagonally downwardly and inwardly to the false floor 25. The diagonal wall element 41 cooperates with the side wall of the cabinet 11 and the inner wall element 28 to define the lower end portion of the delivery passage 29. The charge blower 40 has an outlet which is connected in communicating relation to an opening 43 in the wall element 41, the opening communicating with a diffusion chamber 42 located below the support grating 34 and rearwardly of the divider wall 35. A flap valve 44 is mounted on the wall element 41 by a pivot 45 and serves to normally close the opening 43 when the charge blower is in an energized condition. The flap valve 44, which is normally urged to a closed position by an action of gravity, is urged to the opened position by an action of gravity, is urged to the opened position when the charge blower is energized. When blower 40 is in a deenergized position, flap valve 44 closes by the action of gravity, thus preventing cold air from siphoning into the cabinet.

In order to obtain effective diffusion of the air from the charging blower 40, a diffuser member 46 is mounted on the wall element 41 and is positioned in confronting relation with respect to the opening 43. The diffuser member 46 includes a generally flat, rectangular attachment portion 47 which is secured to the wall element 41 by suitable bolts or the like at a point spaced below the opening 43. The diffuser member 46 also includes a generally rectangular shaped deflector portion 48 which extends angularly upwardly from the attachment portion 47 and the upper portions of its vertical edges are bent or struck in a direction away from the opening 43 to form tip portions 49. The deflector portion 48 of the diffusion member also has a generally rectangular shaped opening 50 therein, and the flap 51 formed by the opening is struck inwardly away from the opening 43 in the wall element 41. It will be noted that the edge portions of the flap 51 are struck upwardly to define ears 52.

The diffusion member 46 also includes a generally rectangular shaped connector portion 53 which is angularly bent from the upper edge of the deflector portion and which is integral with a downturned terminal portion 54. The connector portion has an elongate transversely extending slot 55 therein as best seen in FIG. 6. It is pointed out that the spacing of the deflector portion 48 of the diffusion member from the opening 43 is sufficient to permit the flap valve 44 to swing upwardly in response to air pressure from the charging blower 40 until the lower edge of the flap valve is positioned beneath the connector portion 53. Air from the charging blower is directed through the opening 43 against the deflector member and through the slot 55 and the opening 50. Air passing through the opening 50 is deflected outwardly and upwardly by the ears 52 and is deflected outwardly by the tip portions 49 to cause the air to be evenly distributed in the diffusion chamber 42 below the rear collection chamber 39. Thus, the air will be uniformly distributed upwardly over the heat storage rods 36 so that a good heat exchange action will take place between the upwardly directed curtain of air and the heat storage rods. It will be appreciated that the air curtain flowing from the charging blower upwardly over the heat storage rods in the rear chamber 39 will then pass downwardly over the heat storage rods in the front chamber 38 and will be returned through the return passage 30 to the return duct 32 and thereafter to the solar collector. Therefore, during the charging cycle, the heated air will be circulated between the solar collector and the cabinet in the manner described hereinabove.

Referring again to FIGS. 2 and 5, it will be seen that the inner wall element 27 has an opening 56 therein adjacent its lower end. A flap valve 57 pivoted to the inner surface of the wall 27 normally closes the opening 56 but permits air to flow through the opening 56 during certain operating conditions of the heat storage apparatus. The divider wall 35 also has an opening 58 therein adjacent its lower edge and adjacent one side thereof as best seen in FIGS. 2 and 5. A flap valve 59 is pivotally connected to the rear surface of the divider wall so that the flap valve normally closes the opening 59. It will be seen that when the charging blower 40 is energized to direct heated air from the solar collector through the opening 43, a static pressure will be exerted on the flap valve 57 preventing that valve from opening. However, the air pressure developed by the charging blower 40 causes the valve 59 to open so that the air can be returned through the return passage to the solar collector. Therefore, in the charging cycle, the air is circulated between the solar collector or other heat generator and the heat storage cabinet.

A delivery blower 60 is positioned in the cabinet and its discharge is connected in communicating relation to a valve housing 61 which is positioned around the outlet 23. Therefore, when the delivery blower 60 is energized, during the delivery cycle, air will be sucked into the interior of the cabinet through the louvered inlet opening 21 and will be directed past the flap valve 59 because of the pressure exerted against the valve. The static pressure within the lower end portion of the return passage 30 will cause the flap valve 57 to open and the cool air will be directed into the diffusion chamber 42 and upwardly over the rear bank or group of heat collector rods 36, then downwardly over the heat collector rods positioned in the front chamber 38, and therafter outwardly through the valve housing 61 and outlet 23. As the cool air is circulated through the cabinet all and over the heat storage rods, the cool air will be heated before it is discharged through the outlet 23. It will be appreciated that during this delivery cycle, the charging blower 40 will be de-energized condition.

Referring now to FIG. 5, it should be pointed out that a plurality of delivery blowers can be provided for delivering heated air in different directions during the delivery cycle as desired. In this regard, it is sometimes desirable to discharge the heated air into the room to be heated in different directions especially when the cabinet is located adjacent items of furniture.

Referring now to FIG. 10, it will be seen that a diagram of the control circuit, designated generally by the reference numeral 63, for controlling operation of the charging and delivery blowers is thereshown. The circuit includes a conductor 64 and a conductor 65 connected to a source of electrical power and connected to a junction block 70 mounted on the cabinet 11. A thermostatic type sensor 66 is also mounted on the cabinet and serves to sense the temperature in the room to be heated and exteriorly of the cabinet. The sensor 66 is connected by a conductor to the delivery blower 60 and is connected by a conductor 67a to the junction box and to the conductor 64. An electrical conductor 68 also connects the delivery blower to a second thermostatic sensor 69 positioned interiorly of the cabinet 11 and serving to sense the temperature within the front or rear collector chambers therein. The thermostatic sensor 69 is also connected by conductor 71 to the junction block 70 and to the conductor 65. An electrical conductor 72 is interconnected to the junction box 70 and to the conductor 65 and is also connected to a third thermostatic sensor 73 positioned adjacent the inlet end of the delivery passage 29 and serves to sense the air temperature within the solar collector 33. The sensor 73 is connected by an electrical conductor 74 to the charging blower 40. The charging blower 40 is connected by an electrical conductor 75 to the junction box 70 and to the supply or bus line 64 for receiving current therefrom. A conductor 76 connects the charging blower to the junction box and to a ground in a well known manner.

Referring now to FIGS. 7, 8, and 9, it will be seen that the different modes of operation are thereshown. When the apparatus is energized in a charging cycle, air is circulated between the solar collector and the cabinet 11 as shown in FIG. 7. The charging cycle occurs when the temperature in the solar collector reaches a temperature of 90° F. or more. When this occurs, the thermostatic sensor 73 energizes the charging blower 40 so that air is sucked through the delivery passage 29 and is directed through the opening 43 and is distributed or diffused by the diffuser member 46 in a curtain over the rear bank of heat storage rods 36 in the rear chamber 39. The air passes downwardly over the front bank of each storage rod and passes through the opening 58 in the divider wall and is returned to the solar collector through the return passage and return duct 32. As the heated air is passed over the heat storage rods, heat is absorbed by the rods for reclamation at a later time. It is again pointed out that during this charging cycle, the cooperation of the flap valve 44 with the diffuser member causes the air to form a curtain and be very effectively distributed in a uniform manner over the rear bank of heat collector rods to permit effective heating of all of the heat storage rods. During this operation, the flap valve 57 is maintained in a closed condition by the static pressure developed in the diffuser chamber 42.

After heat is stored in the heat storage rods, heat can be delivered to the room to be heated when two conditions exist. First, the room temperature must drop below 72° F. and the temperature within the cabinet must be in excess of 75° F. It will therefore be seen that the thermostatic sensor 66 will close when the temperature within the room drops below 72° F. and the thermostatic sensor 69 will close when the temperature within the cabinet exceeds 75° F. When these conditions occur, the delivery blower 60 will be energized and air will flow in the manner illustrated in FIG. 8. It will be seen that cold air will be drawn from the floor into the cabinet and will be directed through the opening 56 past flap valve 57, and thereafter will be directed upwardly over the rear bank of the heat collector rods to permit the air to be heated in the heat exchange action. It will be appreciated that the flap valve 44 will be maintained in a closed condition when the delivery blower alone is energized. The heated air will then flow downwardly over the front bank of heat storage rods and then through the blower outlet past flap valve 62 where the heated air is distributed by the air flow director 24. Again, it is pointed out that more than one delivery blower may be used to direct air in different directions during the delivery cycle. This cycle will continue until the internal cabinet temperature exceeds 82° F.

Under certain conditions, both blowers may be simultaneously used in a combination cycle to cause the air to flow in the manner illustrated in FIG. 9. This is a combination cycle wherein the heat storage rods are heated but the air that is normally returned to the collector is instead delivered to the exterior of the cabinet. This combination cycle occurs when the room temperature is below 72° F. and the solar collector temperature is above 90° F. When these conditions are satisfied, the heat sensor 66 will close to energize the delivery blower 60, and the heat sensor 73 will close to energize the charging blower 40. Air will be sucked from the solar collector by the charging blower 40 and will be directed over the heat storage rods and some of the heated air will be directed into the room to be heated by the delivery blower 60. The cold air will be drawn through the inlet of the cabinet and will be directed through passage 30 to return duct 32 and circulated through the collector as shown in FIG. 9. It will appreciated that the static pressure produced in the diffusion chamber maintains the flap valve 57 in a closed condition in this combination mode. With this arrangement, the heat generated by the solar collector will either be recirculated through the heat storage chambers to charge the rods or may be used directly from heating the room space.

From the foregoing, it will be seen that I have provided a novel heat storage and delivery apparatus which is more efficient in operation than any heretofore known comparable apparatus.

It is anticipated that various changes can be made in the size, shape and construction of the heat storage and delivery apparatus disclosed herein without departing from the spirit and scope of the invention as defined by the following claims.

What is claimed is:
1. A heat storage apparatus, comprising:
a rectangular shaped cabinet,
delivery and return passages in said cabinet, said passages being adapted to be connected in commu- nicating relation with a heat generator to permit heated air to be circulated between the heat generator and cabinet, an inlet and an outlet in said cabinet intercommunicating the interior of the cabinet with the exterior, said inlet being connected in communicating relation with said return passage, heat collecting chamber means in said cabinet, a plurality of vertically disposed elongate heat storage rods positioned in said heat collecting chamber means and arranged in side by side relation with respect to each other, a charging blower in said cabinet being operable when energized to cause heated air to be drawn from the heat generator into the delivery passage of the cabinet, first valve means between the delivery passage and said heat collecting chamber and being operable when said charging blower is energized to cause heated air drawn from the heat generator into the delivery passage into said heat collecting chamber over said rods and thereafter into the return passage for return to the heat generator whereby heat exchange action occurs between the heated air and heat storage rods so that heat is stored in the latter, a diffuser member in said heat collecting chamber being operable to cause the air directed into the heat collecting chamber from the charging blower to be uniformly distributed over the heat storage rods, a delivery blower in said cabinet spaced from said charging blower, and when energized causing external unheated air to be drawn into the cabinet through the inlet into said return passage, air control means between the delivery blower and the heat collecting chamber being operable when the delivery blower is energized to direct the unheated air through the heat collecting chamber and over the heat storage rods whereby the air will be heated and then directed by the delivery blower through the outlet into the exterior, and control means including the circuitry arranged in controlling relation with respect to said charging and delivery blowers, first temperature responsive means in said circuitry being operable in response to the temperature within the heat generator reaching a predetermined magnitude to energize the charging blower to direct heated air from the heat generator into the heat collecting chamber, additional heat responsive means in said circuitry being operable to energize the delivery blower when the temperature within the collecting chamber reaches a predetermined temperature and when the external temperature outside the cabinet reaches a predetermined temperature to cause outside unheated air to be directed into the inlet over the heat storage rods to heat the air, and thereafter, discharge the heated air to the exterior.

2. The apparatus as defined in claim 1 and a vertical divider wall in said heat collecting chamber means forming said chamber means into front and rear chambers, said heat storage rods being positioned in side-by-side relation in said chambers.

3. The apparatus as defined in claim 1 wherein said first valve means is positioned adjacent said diffusion member and cooperates with the latter to direct air uniformly over the heat storage rods.

4. The apparatus as defined in claim 1 wherein said air control means includes a second valve between the delivery blower and said return passage and a third valve between said return passage and said heat collecting chamber.

5. The apparatus as defined in claim 1 wherein said first responsive means comprises a first thermostat, said additional heat responsive means comprising a second and third thermostats, one of which is responsive to temperature changes in the collecting chamber of the cabinet and the other thermostat being responsive to temperature changes exteriorly of the cabinet.

6. A heat storage apparatus comprising:
a rectangular shaped container,
delivery and return passages in said container, said passages being adapted to be connected in communicating relation with a heat generator to permit heated air to be circulated between the heat generator and container, an inlet and an outlet in said container intercommunicating the interior of the container with the exterior, said inlet being connected in communicating relation with said return passage, heat collecting chamber means in said container, a plurality of elongate heat storage rods positioned in said heat collecting chamber means and arranged in side-by-side relation with respect to each other, charging and delivery means in said container being operable in a first mode of operation when energized to cause heated air to be directed from the heat generator into the delivery passage of the container, and being operable in a second mode of operation to cause unheated external air to be directed into the container through the inlet into the return passage, first valve means between the delivery passage and said heat collecting chamber being operable when said charging and delivery means is energized to cause heated air drawn from the heat generator into the delivery passage into said heat collecting chamber over said rods and thereafter into the return passage for return to the heat generator whereby heat exchange action occurs between the heated air and heat storage rods so that heat is stored in the latter, means defining an interconnecting passage between said charging and delivery means and said heat collecting chamber being operable to cause the air directed into the heat collecting chamber from the charging and delivery means to be uniformly distributed over the heat storage rods, air control means between the charging and delivery means and the heat collecting chamber being operable when the charging and delivery means is in the second mode of operation to direct the unheated air through the heat collecting chamber and over the heat storage rods whereby the air will be heated and then directed by the charging and delivery means through the outlet into the exterior, and control means including the circuitry arranged in controlling relation with respect to said charging and delivery means, first temperature responsive means in said circuitry being operable in response to the temperature within the heat generator reaching a predetermined magnitude to energize the charging and delivery means in said first mode of operation to direct heated air from the heat generator into the heat collecting chamber, additional heat responsive means in said circuitry being operable to energize the charging and delivery means in said second mode of operation only when the temperature within the collecting chamber reaches a predetermined temperature and when the external temperature outside the cabinet reaches a predetermined temperature to cause outside unheated air to be directed into the inlet over the heat storage rods to heat the air, and thereafter discharge the heated air to the exterior.

7. A heat storage apparatus comprising:

a rectangular shaped container, delivery and return passages in said container, said passages being adapted to be connected in communicating relation with a heat generator to permit heated air to be circulated between the heat generator and container, an inlet and an outlet in said container intercommunicating the interior of the container with the exterior, said inlet being connected in communicating relation with said return passage, heat collecting chamber means in said container, a plurality of elongate heat storage rods positioned in said heat collecting chamber means and arranged in side-by-side relation with respect to each other, a charging blower in said container being operable when energized to cause heated air to be directed from the heat generator into the delivery passage of the container, first valve means between the delivery passage and said heat collecting chamber and being operable when said charging blower is energized to cause heated air drawn from the heat generator into the delivery passage into said heat collecting chamber over said rods and thereafter into the return passage for return to the heat generator whereby heat exchange action occurs between the heated air and heat storage rods so that heat is stored in the latter, means defining an interconnecting passage between said charging blower and said heat collecting chamber being operable to cause the air directed into the heat collecting chamber from the charging blower to be uniformly distributed over the heat storage rods, a delivery blower in said container spaced from said charging blower, and when energized causing external unheated air to be drawn into the container through the inlet into said return passage, air control means between the delivery blower and the heat collecting chamber being oeprable when the delivery blower is energized to direct the unheated air through the heat collecting chamber and over the heat storage rods whereby the air will be heated and then directed by the delivery blower through the outlet into the exterior, and control means including the circuitry arranged in controlling relation with respect to said charging and delivery blowers, first temperature responsive means in said circuitry being operable in response to the temperature within the heat generator reaching a predetermined magnitude to energize the charging blower to direct heated air from the heat generator into the heat collecting chamber, additional heat responsive means in said circuitry being operable to energize the delivery blower when the temperature within the collecting chamber reaches a predetermined temperature to cause outside unheated air to be directed into the inlet over the heat storage rods to heat the air, and thereafter discharge the heated air to the exterior.

8. The apparatus as defined in claim 1 and a divider wall in said heat collecting chamber means forming said chamber means into a pair of chambers, said heat storage rods being positioned in side-by-side relation in said chambers.

9. The apparatus as defined in claim 1 wherein said first valve means is positioned adjacent said interconnecting passage means and cooperates with the latter to direct air uniformly over the heat storage rods.

10. The apparatus as defined in claim 1 wherein said air control means includes a second valve between the delivery blower and said return passage and a third valve between said return passage and said heat collecting chamber.

* * * * *